United States Patent
Nyalamadugu et al.

(10) Patent No.: US 9,764,715 B2
(45) Date of Patent: Sep. 19, 2017

(54) LICENSE PLATE VALIDATION

(71) Applicant: NEOLOGY, INC., Poway, CA (US)

(72) Inventors: Sheshi Nyalamadugu, San Diego, CA (US); Joe Mullis, Oceanside, CA (US); Bobby Leanio, San Diego, CA (US)

(73) Assignee: NEOLOGY, INC., Poway, CA (US)

( * ) Notice: Subject to any disclaimer, the term of this patent is extended or adjusted under 35 U.S.C. 154(b) by 0 days.

(21) Appl. No.: 15/225,769

(22) Filed: Aug. 1, 2016

(65) Prior Publication Data
US 2016/0339871 A1    Nov. 24, 2016

Related U.S. Application Data

(63) Continuation-in-part of application No. 15/093,636, filed on Apr. 7, 2016.

(60) Provisional application No. 62/144,160, filed on Apr. 7, 2015, provisional application No. 62/199,992, filed on Aug. 1, 2015.

(51) Int. Cl.
| | |
|---|---|
| *G06K 19/06* | (2006.01) |
| *B60R 25/24* | (2013.01) |
| *G06K 7/10* | (2006.01) |
| *G06K 19/073* | (2006.01) |
| *G06K 19/077* | (2006.01) |

(52) U.S. Cl.
CPC .......... *B60R 25/24* (2013.01); *G06K 7/10376* (2013.01); *G06K 19/073* (2013.01); *G06K 19/0772* (2013.01); *G06K 19/07771* (2013.01); *G06K 19/07773* (2013.01); *B60R 2325/105* (2013.01)

(58) Field of Classification Search
CPC ............. G06K 7/1097; G06K 17/0025; G06K 19/07749
USPC ............... 235/492, 382, 384, 462.46, 472.02
See application file for complete search history.

(56) References Cited

U.S. PATENT DOCUMENTS

| | | | |
|---|---|---|---|
| 2003/0067389 | A1 | 4/2003 | Look |
| 2004/0095241 | A1 | 5/2004 | Maloney |
| 2006/0261950 | A1 | 11/2006 | Arneson et al. |
| 2007/0171077 | A1 | 7/2007 | Kawarizadeh |

(Continued)

FOREIGN PATENT DOCUMENTS

WO    2008079902 A1    7/2008

OTHER PUBLICATIONS

ISR/Written Opinion mailed on Jul. 19, 2016 in corresponding International Application No. PCTUS2016026526, 11 pages.

*Primary Examiner* — Daniel St Cyr
(74) *Attorney, Agent, or Firm* — Procopio, Cory, Hargreaves & Savitch LLP; Noel Gillespie; Daniel Robertson

(57) ABSTRACT

A license plate validation system for a vehicle is disclosed. This license plate validation system includes: a radio frequency identification (RFID) reader located inside the vehicle and configured to read from an RFID-enabled license plate on the vehicle upon detecting an attempt to start the vehicle; and a microcontroller coupled to the RFID reader and configured to receive, from the RFID reader, information obtained from the RFID-enabled license plate and subsequently determine, based at least on the received information, whether the vehicle is properly registered. In some embodiments, the microcontroller and the RFID reader are integrated as a single electronic module.

18 Claims, 7 Drawing Sheets

(56) References Cited

U.S. PATENT DOCUMENTS

| | | | |
|---|---|---|---|
| 2007/0252703 A1* | 11/2007 | Kato | G06K 19/07749 |
| | | | 340/572.8 |
| 2008/0042848 A1 | 2/2008 | Roberts et al. | |
| 2009/0164319 A1 | 6/2009 | Kole et al. | |
| 2009/0322480 A1 | 12/2009 | Benedict et al. | |
| 2010/0065647 A1 | 3/2010 | Ritamaki et al. | |
| 2010/0283687 A1 | 11/2010 | Ehelen | |
| 2011/0105169 A1* | 5/2011 | Prabhu | G06Q 10/00 |
| | | | 455/509 |
| 2015/0108226 A1* | 4/2015 | Batra | G01M 5/00 |
| | | | 235/492 |
| 2016/0039364 A1* | 2/2016 | Findlay | B60R 13/105 |
| | | | 340/468 |

* cited by examiner

LICENSE PLATE VALIDATION

PRIORITY CLAIM AND RELATED PATENT APPLICATIONS

This patent document claims benefit of priority under 35 U.S.C. 119(e) to U.S. Patent Application No. 62/199,992 entitled "LICENSE PLATE VALIDATION" and filed on Aug. 1, 2015. This application as claims priority under 35 U.S.C. 120 as a continuation-in-part to U.S. patent application Ser. No. 15/093,636, entitled "RADIO FREQUENCY IDENTIFICATION TAG IN A LICENSE PLATE," filed Apr. 7, 2016, which in turn claims priority to U.S. Provisional Patent Application No. 62/144,160, entitled "RADIO FREQUENCY IDENTIFICATION TAG," filed Apr. 7, 2015. The disclosures of the above application are incorporated by reference in their entirety as a part of this document.

BACKGROUND

1. Technical Field

The various embodiments described herein are related to radio frequency identification (RFID), and more particularly to validation of an RFID-enabled license plate.

2. Related Art

RFID technology harnesses electromagnetic fields to transfer data wirelessly. The primary use for RFID technology is the automatic identification and tracking of objects via RFID tags, which can be attached or incorporated into a variety of objects. Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an RFID tag can be used for the purposes of electronic toll collection (ETC), electronic vehicle registration (EVR), border crossing, etc.

RFID technology has been the enabler behind the EVR systems. For example, an RFID registration tag can be placed on the windshield of a vehicle, and can then be scanned by a reader to verify registration and compliance information; however, the existing technology used by the EVR system is limited to passive detection (e.g., at EVR checkpoints) of unregistered or improperly registered vehicles. As such, an improperly registered vehicle or an unregistered vehicle can remain in operation as long as the driver of such a vehicle is able to evade EVR checkpoints.

SUMMARY

Embodiments described herein provide various examples of a license plate validation system implemented on a vehicle operable to automatically validate electronic registration information of the vehicle and to automatically detect whether the license plate on the vehicle is authentic and original.

According to one aspect, a license plate validation system for a vehicle is disclosed. This license plate validation system includes: a radio frequency identification (RFID) reader located inside the vehicle and configured to read from an RFID-enabled license plate on the vehicle upon detecting an attempt to start the vehicle; and a microcontroller coupled to the RFID reader and configured to receive, from the RFID reader, information obtained from the RFID-enabled license plate and subsequently determine, based at least on the received information, whether the vehicle is properly registered. In some embodiments, the microcontroller and the RFID reader are integrated as a single electronic module.

According to another aspect, the microcontroller is configured to determine whether the vehicle is properly registered by: determining whether the RFID reader is able to read from the RFID-enabled license plate; and in response to determining that the RFID reader is not able to read from the RFID-enabled license plate, determining that the vehicle is not properly registered. In some embodiments, upon determining that the vehicle is not properly registered, the microcontroller is further configured to prevent the vehicle from starting. For example, the RFID reader is not able to read from the RFID-enabled license plate as a result of a registration sticker on the RFID-enabled license plate has degraded due to an expired registration.

According to still another aspect, the microcontroller stores a first identifier uniquely identifying the vehicle. Moreover, the received information from the RFID reader includes a second identifier stored in an RFID module embedded in the RFID-enabled license plate. The microcontroller can determine whether the vehicle is properly registered by: determining whether the second identifier read from the RFID-enabled license plate matches the first identifier stored on the microcontroller; and if a match is found, determining that the vehicle is properly registered. In some embodiments, the microcontroller is configured to permit the vehicle to start if the first and second identifiers match each other. However, if the second identifier does not match the first identifier, the microcontroller is configured to prevent the vehicle from starting and alert owner of the vehicle that the RFID-enabled license plate is not a valid license plate.

According to still another aspect, a technique for automatically validating electronic registration information based on an RFID-enabled license plate of a vehicle is disclosed. Upon detecting an attempt to start the vehicle, an RFID reader inside the vehicle is activated to access an RFID transponder embedded in the RFID-enabled license plate. A microcontroller coupled to the RFID reader next determines whether the RFID reader is able to read from the RFID transponder. If the RFID reader is not able to read from the RFID transponder, the microcontroller prevents the vehicle from starting. Alternatively, if the RFID reader is able to read from the RFID transponder, the microcontroller receives from the RFID reader, an identifier read from the RFID transponder and subsequently determines whether the received identifier matches an identifier stored on the microcontroller. If the two identifiers match, the microcontroller determines that the vehicle is properly registered and permits the vehicle to start. Otherwise, the microcontroller prevents the vehicle from starting.

According to still another aspect, a technique for automatically detecting if a license plate on a vehicle is original is disclosed. To begin, an RFID reader inside the vehicle is activated to read an RFID-enabled license plate on the vehicle. A microcontroller coupled to the RFID reader receives an identifier read from the RFID-enabled license plate, and subsequently determines whether the received identifier matches an identifier stored on the microcontroller. If the two identifiers match, the microcontroller determines that the RFID-enabled license plate is original. Otherwise, the microcontroller alerts owner of the vehicle that the RFID-enabled license plate is not original.

Other features and advantages of the present inventive concept should be apparent from the following description which illustrates by way of example aspects of the present inventive concept.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Embodiments described herein provide various examples of a license plate validation system implemented on a vehicle operable to automatically validate electronic registration information of the vehicle and to automatically detect if the license plate on the vehicle is authentic and original.

Figure 1:
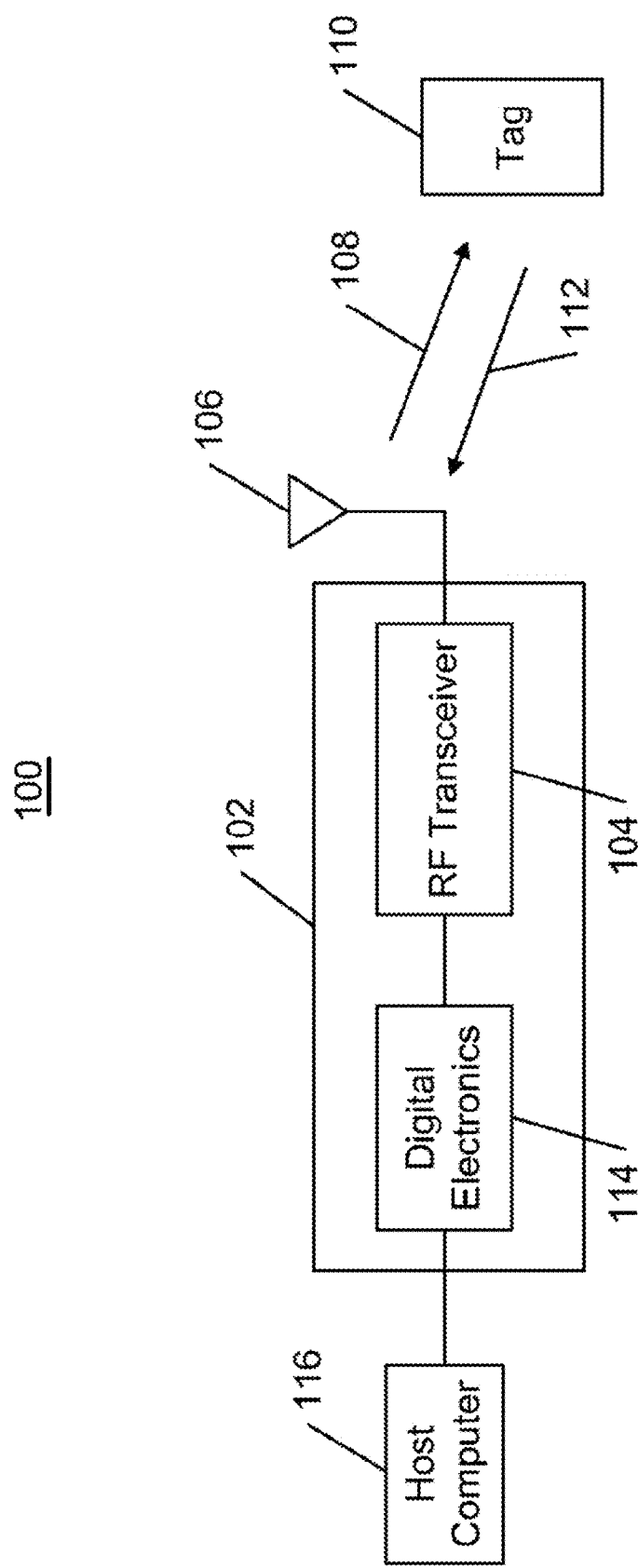
FIG. 1 shows a diagram illustrating an exemplary RFID system in accordance with one embodiment described herein.

FIG. 1 shows a diagram illustrating an exemplary RFID system 100 in accordance with one embodiment described herein. In system 100, RFID interrogator/reader 102 communicates with one or more RFID tags 110. Data can be exchanged between interrogator/reader 102 and RFID tag 110 via radio transmit signal 108 and radio receive signal 112. RFID interrogator/reader 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic field emitted by antenna 106, RFID tag 110 is excited and transmits data back to RF interrogator/reader 102. A change in the impedance of RFID tag 110 can be used to signal the data to RF interrogator/reader 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator/reader 102 facilitates the reading or writing of data to RFID tags, e.g. RFID tag 110 that are within range of the RF field emitted by antenna 104. Together, RF transceiver 104 and digital electronics 114 comprise RF interrogator/reader 102. Finally, digital electronics 114 and can be interfaced with an integral display and/or provide a parallel or serial communications interface to a host computer or industrial controller, e.g. host computer 116.

In some embodiments, an RFID transponder (e.g., RFID tag 110 described with respect to FIG. 1) can be embedded in a vehicle's license plate to form an RFID-enabled license plate; however, vehicle license plates are most commonly made from metal (e.g., aluminum). Direct and uninsulated contact between an RFID transponder (single or multi-frequency) and a metal license plate (e.g., by applying the transponder directly onto the metal license plate) can short or severely detune the transponder's antenna(s) (e.g., antenna 116 described with respect to FIG. 1), rendering the transponder virtually unreadable. Thus, in the exemplary embodiments described in more detail below, a transponder is embedded in a metal license plate in ways that neither compromise the performance of the transponder's antenna(s) nor add undesirable bulk to the license plate's usual dimensions. In some exemplary embodiments, an RFID-enabled license plate is configured to resonate at multiple frequencies (e.g., HF and UHF bands). In some embodiments, a resonator for the transponder is formed from the license plate itself if the license plate is metal. In other embodiments, whether the plate is metal or non-metal, the resonator can also be formed from a metalized layer (e.g., retro-reflective material, holographic foil, or any other appropriate metallic substrate) covering the license plate.

Figure 2A:
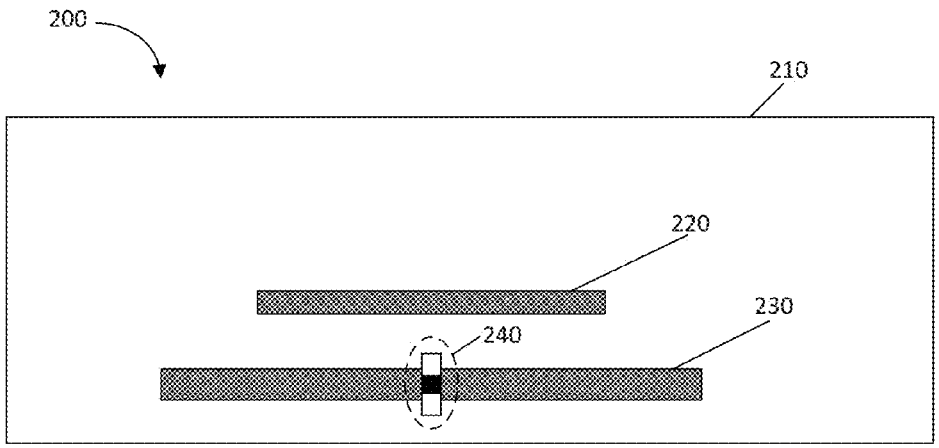
FIG. 2A illustrates the top view of an embodiment of a RFID-enabled license plate in accordance with one embodiment described herein.

FIG. 2A illustrates the top view of an embodiment of a RFID-enabled license plate 200 in accordance with one embodiment described herein. In various embodiments, RFID-enabled license plate 200 includes a metal plate 210. In various embodiments, RFID-enabled license plate 200 can be configured to include one or more slots, which are open areas that are cut or punched out of plate 210. In some embodiments, RFID-enabled license plate 200 can be configured to include multiple slots. As shown in FIG. 2A, RFID-enabled license plate 200 includes a slot 220 and a slot 230. In various embodiments, both slot 220 and slot 230 can be filled with a non-metal material. In some embodiments, the non-metal material can be stuffed, extruded, or otherwise deposited into slot 220 and slot 230. In various embodiments, the non-metal material remains flush with respect to both the front and rear surfaces of plate 210. Furthermore, as shown in FIG. 2A, a RFID strap 240 can be positioned across slot 230 as illustrated. In some embodiments, RFID strap 240 includes a RFID chip as well as contacts that are either electrically connected to or capacitively coupled with plate 210. In other embodiments, RFID strap 240 can include a RFID chip and an antenna, wherein the antenna or resonator is inductively coupled with plate 210. In some embodiments, the respective and relative dimensions, spacing, and location of slots 220 and 230 are configured such that the slot antenna formed from plate 210, slots 220 and 230, and strap 240 will resonate at multiple desired frequencies. In various embodiments, the slot antenna configured according to FIG. 2A is able to resonate at both a HF (e.g., 13.56 MHz) and a UHF (e.g., 915 MHz) band. As described in more detail below, in other embodiments, instead of multiple slots (e.g., slot 220 and slot 230 in Plate 210) configured to resonate at several different frequencies, a RFID-enabled license plate can also include just a single slot configured to resonate at a single frequency.

Figure 2B:
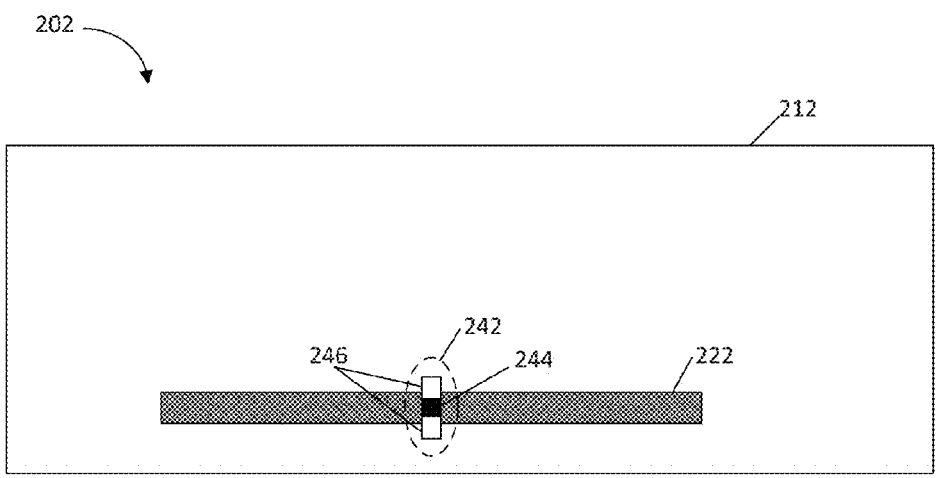
FIG. 2B illustrates the top view of another embodiment of an RFID-enabled license plate in accordance with one embodiment described herein.

FIG. 2B illustrates the top view of another embodiment of an RFID-enabled license plate 202 in accordance with one embodiment described herein. In various embodiments, RFID-enabled license plate 202 includes a plate 212 that is constructed out of metal. As shown in FIG. 2B, RFID-enabled license plate 202 is configured to include a single slot 222, which is cut or punched out of plate 212. In various embodiments, slot 222 can be stuffed, extruded, or otherwise deposited with a non-metal material that remains flush with respect to both the front and rear surfaces of plate 212. In the embodiment shown in FIG. 2B, an RFID strap 242 is positioned over slot 222. In various embodiments, RFID strap 242 includes an RFID Chip 244 and contacts 246. In various embodiments, contacts 246 can be connected to plate 212 through solder, adhesive paste, or both. In some embodiments, contacts 246 are capacitively coupled with plate 212. Depending on the embodiment, RFID strap 242 can be placed on either the front surface or the rear surface of plate 212. Configured according to FIG. 2B, plate 212 can act as a slot antenna coupled with RFID Chip 244, which makes RFID Chip 244 less sensitive to the detuning effects of a metal car frame. In other embodiments, RFID strap 240 can include a RFID chip and an antenna or resonator, where the antenna or resonator is inductively coupled with plate 210.

Figure 2C:
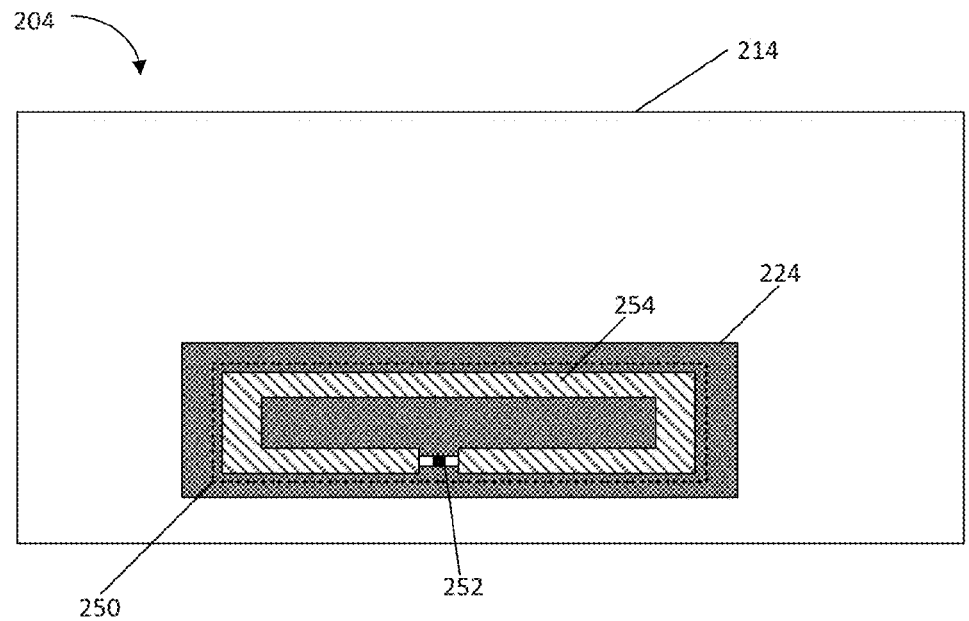
FIG. 2C illustrates the top view of yet another embodiment of an RFID-enabled license plate in accordance with one embodiment described herein.

FIG. 2C illustrates the top view of yet another embodiment of an RFID-enabled license plate 204 in accordance with one embodiment described herein. In various embodiments, RFID-enabled license plate 204 comprises a metal plate 214 that includes a slot 224, which is an open area that has been cut or punched out of plate 214. In some embodiments, instead of an RFID strap (e.g., RFID straps 240 and 242 described with respect to FIGS. 2A and 2B) positioned over slot 224, an RFID transponder module 250 is placed directly inside of slot 224 as shown in FIG. 2C. In the embodiment shown, RFID transponder module 250 includes an RFID chip 252 that is coupled with a feeding loop 254. Furthermore, as shown in FIG. 2C, slot 224 and loop 254 can be positioned such that feeding loop 254 is capacitively coupled with plate 214. Although not shown, in other embodiments, feeding loop 254 can be inductively coupled with plate 214. Advantageously, RFID transponder module 250 can be made sufficiently thin such that even when RFID transponder module 250 is installed within slot 224, it creates a substantially planar surface with respect to slot 224.

Additional embodiments of an RFID-enabled license plate are described in U.S. Pat. Nos. 8,344,890, and 9,007,215, the disclosures of which are incorporated by reference herein in their entirety. It will be appreciated that an RFID-enabled license plate can be implemented in a different manner from the ones described above without departing from a scope of the present disclosure.

In some embodiments, an RFID-enabled license plate can include an RFID transponder that will not function absent a valid and properly positioned vehicle registration sticker. For example, in some embodiments, the RFID transponder can be intentionally tuned to a lower frequency (e.g., less than 915 MHz) and therefore cannot be properly read by a UHF RFID reader. Meanwhile, in some embodiments, applying a valid vehicle registration sticker in the correct position on the RFID-enabled license plate tunes the transponder to the correct and operational frequency (e.g., 915 MHz) so that the transponder can be read by a UHF RFID reader. In various embodiments, the vehicle registration sticker is fabricated from or otherwise includes one or more metallic or other conductive materials.

Figure 3:
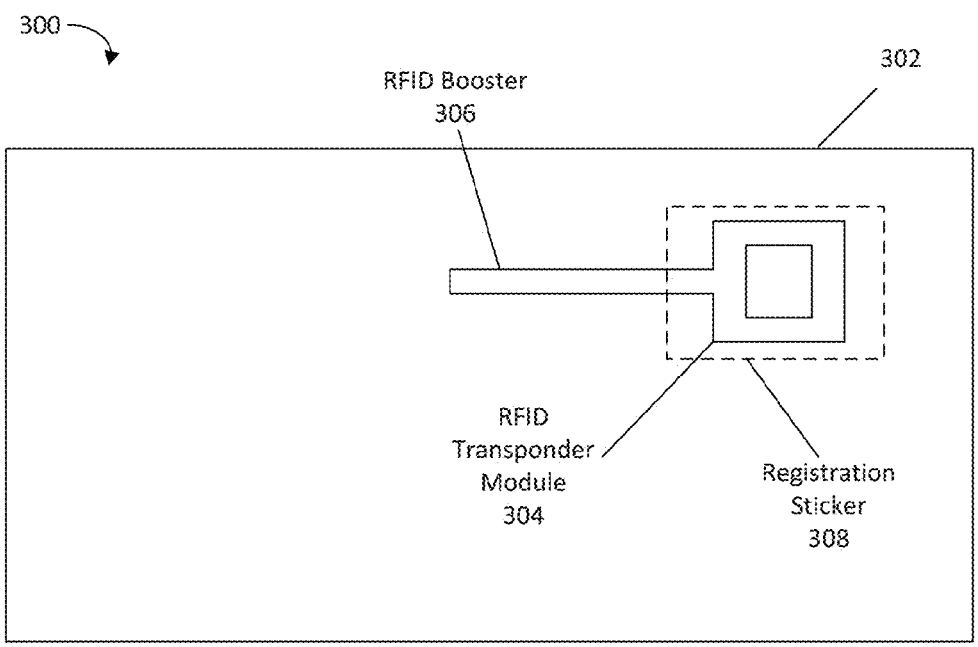
FIG. 3 illustrates the top view of an embodiment of an RFID-enabled license plate operable in conjunction with a vehicle registration sticker in accordance with one embodiment described herein.

FIG. 3 illustrates the top view of an embodiment of an RFID-enabled license plate 300 operable in conjunction with a vehicle registration sticker in accordance with one embodiment described herein. It can be seen that the embodiment of FIG. 3A shares many characteristics with the embodiment disclosed in FIGS. 3, 4, 5, 6, and 7 in Parent application Ser. No. 15/093,636, which is incorporated herein by reference as if set forth in full. As can be seen in FIG. 3, RFID-enabled license plate 300 includes a metal plate 302 and an RFID transponder module 304. In some embodiments, metal plate 302 and RFID transponder module 304 are configured in the manner of: metal plate 210 and RFID transponder module 240 described with respect to FIG. 2A; metal plate 212 and RFID transponder module 242 described with respect to FIG. 2B; or metal plate 214 and RFID transponder module 250 described with respect to FIG. 2C. As shown in FIG. 3, RFID-enabled license plate 300 further includes slot 306 coupled, which comprises a, for example, square and to accommodate module 304 and an elongated area. In some embodiments, slot 306 can form a slot antenna. In certain embodiments, module 304 can also be coupled with plate 302.

In some embodiments, RFID transponder module 304 is intentionally tuned to an inoperable frequency. For example, RFID transponder module 304 can be tuned to a lower frequency than an UHF frequency needed to communicate data (e.g., identifier) with an UHF RFID reader. In some embodiments, a valid vehicle registration sticker 308 needs to be applied in a proper location on plate 302 in order for RFID transponder module 304 to function properly (e.g., to be scanned or read by a UHF RFID toll reader). As will be described in more detail below, applying a properly sized vehicle registration sticker 308 in a proper location on RFID-enabled license plate 300 tunes RFID transponder module 304 to the proper frequency band. In other embodiments, an RFID-enabled license plate includes an RFID booster but without an RFID transponder module. In these embodiments, the RFID-enabled license plate requires a vehicle registration sticker integrated with an RFID transponder module positioned in the proper location relative to plate 302 to operate properly. Although FIG. 3 shows that vehicle registration sticker 308 is placed directly over RFID transponder module 304, in embodiments where vehicle registration sticker 308 is composed of or otherwise includes conductive material, RFID transponder module 304 does not have to be directly underneath vehicle registration sticker 308.

Figure 4:
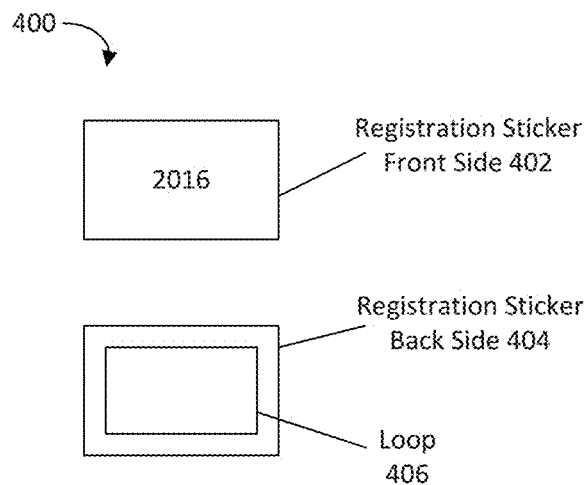
FIG. 4 illustrates an exemplary vehicle registration sticker which is used in conjunction with an RFID-enabled license plate in accordance with one embodiment described herein.

FIG. 4 illustrates an exemplary vehicle registration sticker 400 that can be used in conjunction with an RFID-enabled license plate in accordance with one embodiment described herein. In various embodiments, vehicle registration sticker 400 can be used to implement vehicle registration sticker 308 described with respect to FIG. 3. As shown in FIG. 4, vehicle registration sticker 400 includes a front side 402 and a back side 404, which further includes a loop 406. In various embodiments, when vehicle registration sticker 400 is affixed to a RFID-enabled license plate (e.g., RFID-enabled license plate 300) in a proper location, loop 406 on the back side of the sticker 400 couples to an RFID transponder and tunes the RFID transponder to the proper frequency band for operation. In some embodiments, vehicle registration sticker 400 can additionally include an RFID transponder module (i.e., a chip, or a chip and an antenna). In these embodiments, placing vehicle registration sticker 400 on an RFID-enabled license plate can couple the RFID transponder module on vehicle registration sticker 400 directly with an RFID Booster. For example, in some embodiments, vehicle registration sticker 400 can include a single frequency (e.g., HF or NFC) RFID transponder.

Typically, in the United States, motorists are required to renew their vehicle registration on an annual basis. For example, California license plates have a month and a year sticker. A properly registered vehicle in California will have been issued a sticker that shows the current year. Although the registration status of a vehicle can be verified visually, in many instances, it would be preferable to verify vehicle registration status through electronic and automated means. Thus, in various embodiments, a vehicle registration sticker that is used in conjunction with a RFID-enabled license plate can further include or be constructed out of a material that gradually degrades as the vehicle's registration approaches expiration. For example, vehicle registration sticker 400 can be made out of a retro-reflective material that degrades over time. In another embodiment, loop 406 on the back of vehicle registration sticker 400 can be made out of a material that degrades over time. Moreover, in some embodiments, the adhesive used to bond vehicle registration sticker 400 to a RFID-enabled license plate can degrade over time. In this manner, an up-to-date vehicle registration sticker is able to tune a RFID transponder in the RFID-enabled license plate to the proper frequency, while an expired vehicle registration sticker cannot. Consequently, a vehicle cannot successfully pass through an EVR checkpoint and will fail various license plate validation techniques disclosed below, unless the vehicle is also properly registered and is displaying a current vehicle registration sticker.

Figure 5:
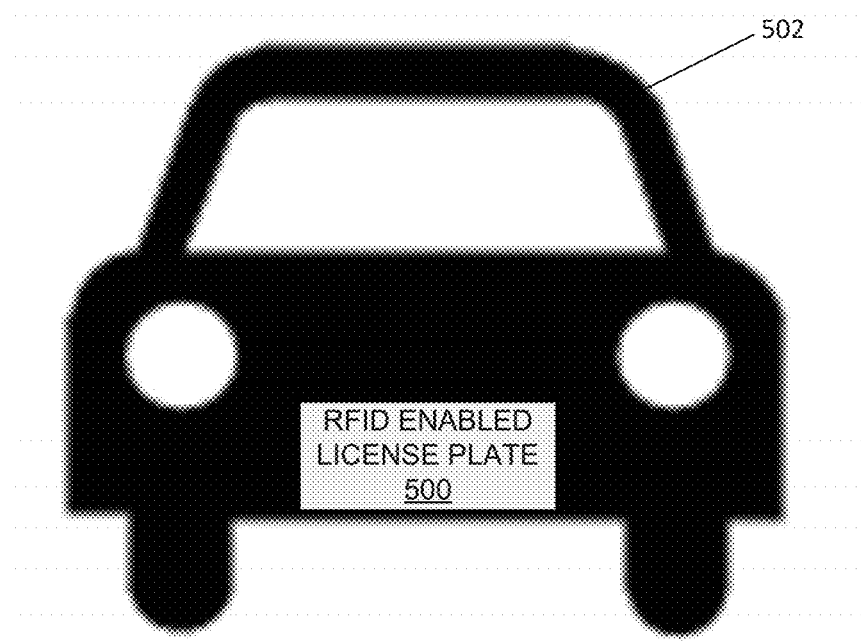
FIG. 5 illustrates a deployment of an RFID-enabled license plate on a vehicle in accordance with one embodiment described herein.

FIG. 5 illustrates a deployment of an RFID-enabled license plate 500 on a vehicle 502 in accordance with one embodiment described herein. As shown in FIG. 5, RFID-enabled license plate 500 can be installed on vehicle 502 as the front license plate. In other embodiments, an RFID-enabled license plate can be installed on a vehicle as the back license plate or as both the front and the back license plates. In one embodiment, RFID-enabled license plate 500 can be associated with a unique identifier for uniquely identifying vehicle 502, which is stored on an RFID module embedded in RFID-enabled license plate 500.

Figure 6:
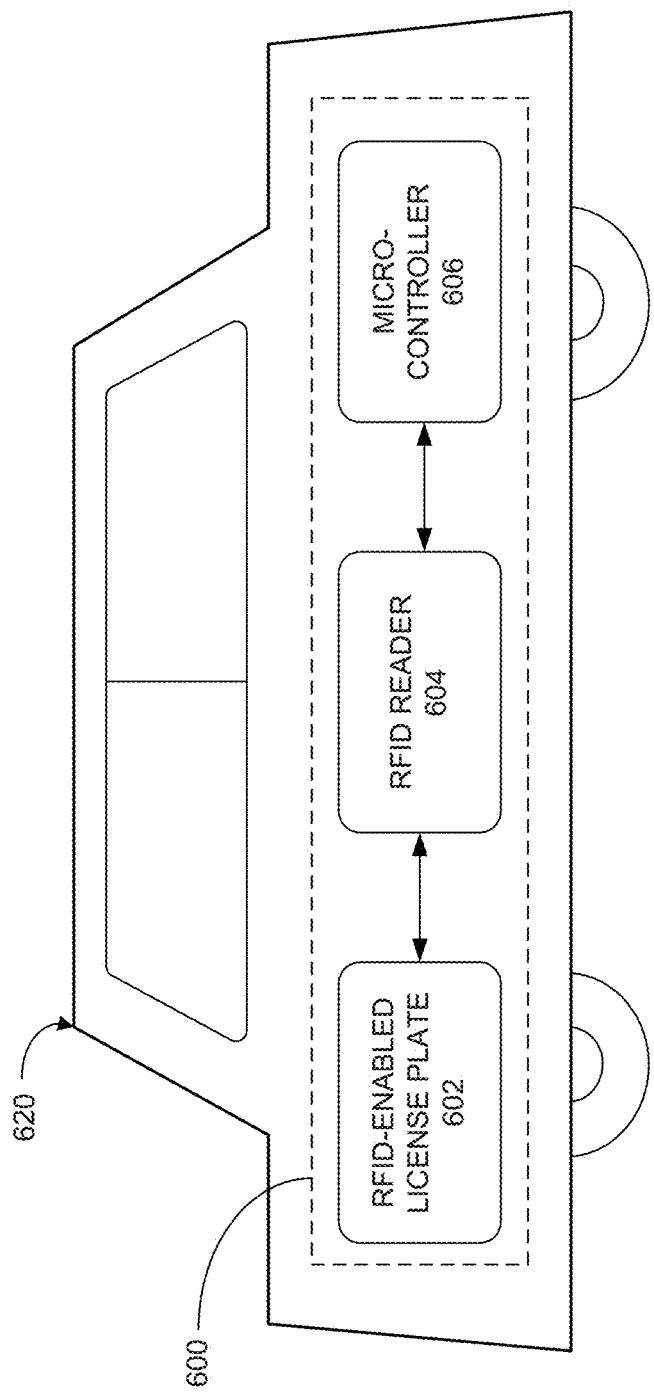
FIG. 6 shows a block diagram of an exemplary license plate validation system in accordance with one embodiment described herein.

FIG. 6 shows a block diagram of an exemplary license plate validation system 600 integrated with a vehicle 620 in accordance with one embodiment described herein. As shown in FIG. 6, validation system 600 includes a RFID-enabled license plate 602, an RFID reader 604, and, for example, a microcontroller 606 or other processor, which are coupled to each other by wired connections, wireless connections, or a combination of both. Note that RFID-enabled license plate 602 can be implemented in various ways including based on one of the embodiments described with respect to FIGS. 2A-2C and 3-4. Typically, to perform EVR validation on a vehicle, a RFID reader permanently installed at an EVR checkpoint or a hand-held RFID reader operated by an inspector at an EVR checkpoint is used to validate the registration of vehicle 620. In contrast, the disclosed RFID reader 604 is an "onboard" RFID reader located in the vehicle 620 registered under RFID-enabled license plate 602.

In various embodiments, RFID reader 604 can be positioned on vehicle 620 at a location within an effective read range of the RFID tag within RFID-enabled license plate 602. Notably, if the RFID tag within RFID-enabled license plate 602 is based on an UHF transmission, the effective read range is typically longer than 3 feet and up to 37 feet. In some embodiments, RFID reader 604 can be implemented according to RF reader 102 described with respect to FIG. 1. In various embodiments, RFID reader 604 can be a multi-purpose RFID reader configured to perform other RFID read functions such as for locking and unlocking the vehicle 620. In other embodiments, RFID reader 604 is a dedicated RFID reader configured specifically for the function of validating RFID-enabled license plate 602.

In some embodiments, microcontroller 606 is implemented as an onboard computer of vehicle 620. In these embodiments, microcontroller 606 is typically embedded in vehicle 620 during the manufacturing of vehicle 620. Microcontroller 606 can be coupled to RFID reader 604 through a wired or wireless connection. In some embodiments, microcontroller 606 and RFID reader 604 are integrated as a single electronic module, for example, as a single System on Chip (SoC). In some embodiments, microcontroller 606 and RFID reader 604 are integrated into a single package inside a protective case. Microcontroller 606 can be implemented as a field-programmable gate array (FPGA) or one or more application specific integrated circuits (ASICs). In other embodiments, microcontroller 606 is a microprocessor chip such as a CPU. In some embodiments, microcontroller 606 is implemented as a SoC.

In various embodiments, microcontroller 606 can store a unique identifier, which can also be stored on a memory of the RFID-module (e.g., an RFID transponder/tag) embedded in RFID-enabled license plate 602. This identifier can be used to uniquely identify vehicle 620 registered under RFID-enabled license plate 602. Hence, if RFID-enabled license plate 602 is stolen from vehicle 620 and another RFID-enabled license plate is placed on vehicle 620, the identifier stored on microcontroller 606 would not match the identifier stored in the RFID-module embedded in the replaced license plate. By the same token, if the vehicle which receives the stolen RFID-enabled license plate 602 is also equipped with the disclosed license plate validation system, this vehicle would also have a unique identifier stored on its microcontroller, and this identifier would not match the identifier stored in the RFID transponder/tag embedded in the stolen enabled license plate 602.

In various embodiments, when an attempt is made to turn on or start the vehicle 620, onboard RFID reader 604 is configured to read an identifier stored in the RFID transponder/tag embedded in RFID-enabled license plate 602 and transmit that information to microcontroller 606. Subsequently, microcontroller 606 can validate RFID-enabled license plate 602 by comparing the identifier read from RFID-enabled license plate 602 with the identifier stored on microcontroller 606. Microcontroller 606 can permit vehicle 620 to start only if the received identifier matches the stored identifier on microcontroller 606. In the event that microcontroller 606 is unable to validate RFID-enabled license plate 602, for example, if the two identifiers do not match, microcontroller 606 can be configured to prevent vehicle 620 from starting. Note that this validation technique facilitates detecting stolen license plates both on vehicles from which the license plates are stolen and on the vehicles upon which the stolen license plates are fraudulently placed.

While the license plate validation process described above assumes that vehicle 620 is properly registered if the received identifier read from RFID-enabled license plate 602 matches the stored identifier on microcontroller 606, other embodiments can include additional steps to further validate the registration information associated vehicle 620. For example, in one embodiment, after determining that the received identifier read from RFID-enabled license plate 602 matches the stored identifier on microcontroller 606, microcontroller 606 next accesses an external server containing up-to-date vehicle registration information by using the validated identifier.

In some embodiments, in response to an attempt to turn on or start the vehicle 620, onboard RFID reader 604 is configured to attempt to read data from RFID-enabled license plate 602. In the event that RFID reader 604 is unable to read data from RFID-enabled license plate 602, RFID reader 604 communicates with microcontroller 606 to indicate that an attempt to read data from RFID-enabled license plate 602 has failed. Upon received the information indicating failed license plate access attempt, microcontroller 606 is configured to prevent vehicle 620 from starting. In various embodiments, the above failure to read data from RFID-enabled license plate 602 can be caused by an expired registration sticker, e.g., registration sticker 308 in RFID-enabled license plate 300, or it can be caused by the absent of a valid registration sticker altogether.

In other embodiments, failure to read the identifier, or reading of an incorrect identifier, can cause controller 606 to generate a warning message that can be displayed to the driver, instead of or in addition to preventing vehicle 620 from starting.

As mentioned above, a vehicle registration sticker on RFID-enabled license plate 602 can include or be constructed from material that degrades gradually over a period of time. For example, adhesives used to affix the vehicle registration sticker to the plate of RFID-enabled license plate 602 can degrade at the end of the registration period for vehicle 620. In one embodiment, an expired and degraded vehicle registration sticker in RFID-enabled license plate 602 is unable to tune a RFID transponder in RFID-enabled license plate 602 to a proper frequency for communicating with RFID reader 604. As such, RFID reader 604 cannot read data out of the RFID module embedded in RFID-enabled license plate 602. In another embodiment, an expired and degraded vehicle registration sticker in RFID-enabled license plate decouples the RFID module in RFID-enabled license plate 602 from an RFID booster (e.g., RFID booster 306 shown in FIG. 3), thereby rendering the plate 602 unable to communicate data to RFID reader 604 on vehicle 620. In all of the above scenarios, it is then required that the vehicle registration sticker remain current/valid in order for the embedded RFID module to communicate with onboard RFID reader 604, including transmitting and receiving the identifier necessary to validate the RFID-enabled license plate 602 and to start vehicle 620.

As mentioned above, onboard RFID reader 604 is activated to communicate with RFID-enabled license plate 602 in response to an attempt to turn on or start the vehicle 620. In one embodiment, when a car key is inserted into an ignition switch/starter of vehicle 620, a signal is generated and subsequently received by RFID reader 604, and upon detecting this signal indicating an attempt to turn on vehicle 620, RFID reader 604 is activated to communicate with RFID-enabled license plate 602. The signal for activating RFID reader 604 can be generated directly from the car key and wirelessly transmitted to RFID reader 604. Alternatively, the signal for activating RFID reader 604 can be generated by microcontroller 606 upon detecting the attempt to turn on or start the vehicle 620, which is then transmitted from microcontroller 606 to RFID reader 604. Furthermore, the signal for activating RFID reader 604 can be generated by an onboard computer chip other than microcontroller 606 upon detecting the attempt to turn on or start the vehicle 620, which is then transmitted from this computer chip directly to RFID reader 604 or indirectly through microcontroller 606.

In some other embodiments, if vehicle 620 uses a remote/wireless car starter, a signal is generated when a start button on the remote/wireless starter is pressed indicating an attempt to start vehicle 620. This signal is subsequently transmitted to and received by RFID reader 604. Upon detecting this signal, RFID reader 604 is activated to communicate with RFID-enabled license plate 602. The signal for activating RFID reader 604 can be generated directly by the remote/wireless starter and wirelessly transmitted to RFID reader 604. Alternatively, the signal for activating RFID reader 604 can be generated by microcontroller 606 upon detecting the attempt to start vehicle 620 by pushing a button on the remote/wireless starter, which is then transmitted from microcontroller 606 to RFID reader 604. Furthermore, the signal for activating RFID reader 604 can be generated by an onboard computer chip other than microcontroller 606 upon detecting the attempt to start the vehicle 620 by the remote/wireless starter, which is then transmitted from this computer chip directly to RFID reader 604 or indirectly through microcontroller 606.

In some embodiments, the disclosed license plate validation system 600 is configured to detect and alert a stolen RFID-enabled license plate to the owner of vehicle 620 without requiring an attempt to turn on or start the vehicle 620. This can be achieved by a periodic communication between RFID reader 604 and RFID-enabled license plate 602. In one embodiment, microcontroller 606 can periodically trigger RFID reader 604 to access RFID-enabled license plate 602 to obtain the identifier. If the identifier obtained from RFID-enabled license plate 602 does not match the identifier stored on microcontroller 606, or no identifier is detected, microcontroller 606 determines that the original license plate has been stolen. Microcontroller 606 can be configured to send an alert to the owner of vehicle 620. Note that this technique can detect a stolen license plate well before the next attempt to turn on or start the vehicle takes place. In some embodiments, if the RFID-module embedded in RFID-enabled license plate 602 is an active RFID-module, this RFID-module can periodically transmit the identifier to RFID reader 604 which is then validated by microcontroller 606 to determine if the original license plate has been stolen.

According to one exemplary embodiment, RFID-enabled license plate 602 can also be used in one or more account management applications. For example, RFID enabled license plate 602 can be used to track a vehicle for purposes of electronic tolling, parking access, and border control. At least some applications for account management are disclosed in U.S. patent application Ser. No. 14/459,299, now U.S. Pat. No. 9,355,398, and U.S. patent application Ser. No. 15/167,829. At least some applications for the RFID-enabled license plate 300 are described in U.S. patent application Ser. No. 11/962,047, now U.S. Pat. No. 8,344,890, U.S. Ser. Nos. 13/708,353, and 14/685,530, now U.S. Pat. No. 9,007,215, the disclosures of which are incorporated herein by reference in their entirety.

In some embodiments, access (e.g., by the onboard RFID reader) to the memory on the RFID module embedded in RFID enabled license plate 602 can be granted based on a security key. The provision of secure identification solutions is described in U.S. Pat. No. 7,081,819, U.S. Pat. No. 7,671,746, U.S. Pat. No. 8,237,568, U.S. Pat. No. 8,322,044, and U.S. Pat. No. 8,004,410, the disclosures of which are incorporated by reference herein in their respective entirety.

In some embodiments, RFID-enabled license plate 602 can include at least one multi-frequency RFID tag that allows the RFID-enabled license plate 602 to interface with multiple RFID systems (e.g., EVR, electronic toll collection (ETC), etc.). Multi-frequency RFID tags are described in Reissued U.S. Pat. Nos. RE 43,355 and RE 44,691, the disclosures of which are incorporated by reference herein in their respective entirety.

Some applications can require a placement of metallic material (e.g., retro-reflective material, holographic image) over RFID-enabled license plate 602. In order to preserve the transmission and reception capabilities of RFID enabled license plate 602, a selective de-metallization process can be employed to treat the metallic material. Selective de-metallization is described in U.S. Pat. Nos. 7,034,688 and 7,463,154, the disclosures of which are incorporated by reference herein in their respective entirety.

Figure 7:
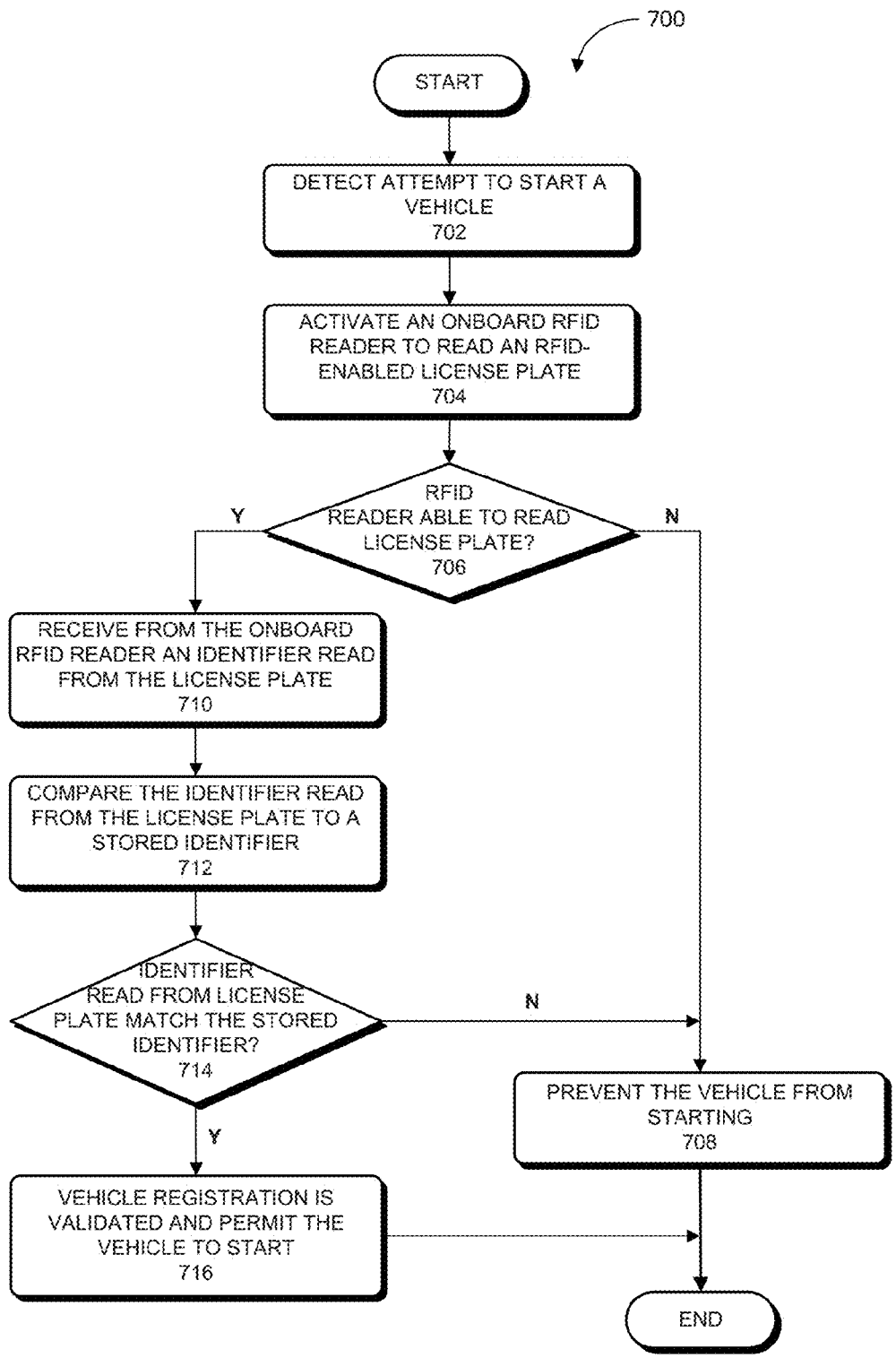
FIG. 7 presents a flowchart illustrating a process for validating a license plate in accordance with one embodiment described herein.

FIG. 7 presents a flowchart illustrating a process 700 for validating a license plate in accordance with one embodiment described herein. In some embodiments, process 700 is performed by microcontroller 606 with respect to RFID-enabled license plate 602 onboard vehicle 620.

As shown in FIG. 7, the process begins when a microcontroller onboard a vehicle detects an attempt to start the vehicle (step 702). In response to detecting the attempt to start the vehicle, the microcontroller activates an onboard RFID reader to read an RFID-enabled license plate on the vehicle, wherein the RFID-enabled license plate includes electronic registration information of the vehicle (step 704). The microcontroller next determines whether the RFID reader is able to read the RFID-enabled license plate (step 706). If the microcontroller determines that the onboard RFID reader is not able to read the RFID-enabled license plate, the microcontroller prevents the vehicle from starting (step 708), and the process terminates. As mentioned above, a failure to read the RFID-enabled license plate can be caused by a degraded validation sticker on the RFID-enabled license plate indication the registration of the vehicle has expired.

Alternatively, if the microcontroller determines that the onboard RFID reader is able to read the RFID enabled license plate, the microcontroller receives from the onboard RFID reader an identifier read from the RFID enabled license plate (step 710). The microcontroller subsequently compares the identifier read from the RFID enabled license plate with an identifier stored on the microcontroller (step 712). As mentioned above, the identifier stored on the microcontroller can be used to uniquely identify the vehicle and also should match the identifier stored in the memory of the RFID tag embedded in the RFID-enabled license plate associated with the vehicle.

The microcontroller subsequently determines if the identifier read from the RFID-enabled license plate matches the stored identifier on the microcontroller (step 714). If so, the microcontroller determines that the vehicle is properly registered and permits the vehicle to start (step 716). Otherwise, if the microcontroller determines that the identifier read from the RFID-enabled license plate does not match the stored identifier, the microcontroller determines prevents the vehicle from starting (step 708). In some embodiments, if the identifiers fail to match up, the microcontroller can also determine that the original license plate on the vehicle is stolen and subsequently send an alert to the owner of the vehicle to report the stolen license plate.

Figure 8:
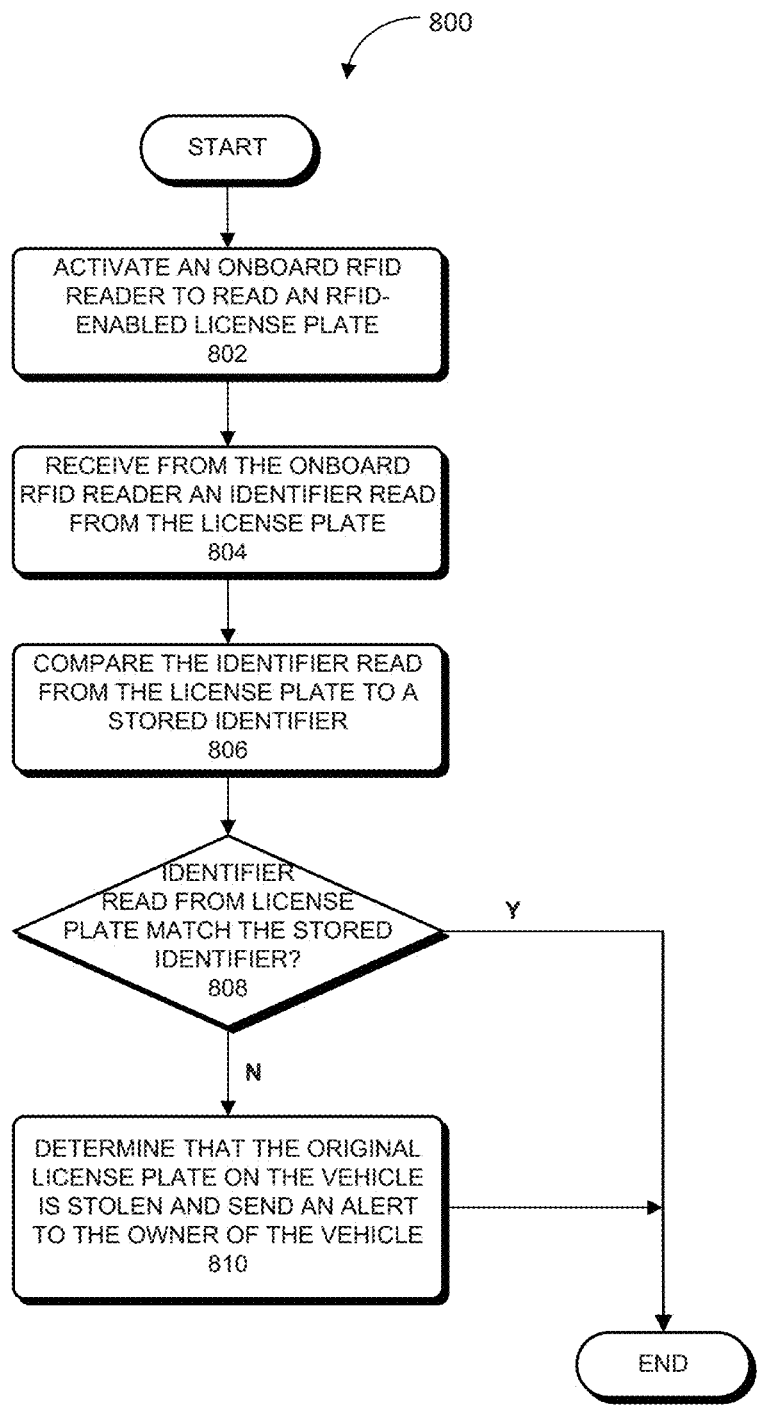
FIG. 8 presents a flowchart illustrating a process for detecting a stolen license plate in accordance with one embodiment described herein.

FIG. 8 presents a flowchart illustrating a process 800 for detecting a stolen license plate in accordance with one embodiment described herein. In some embodiments, process 800 is performed by microcontroller 606 with respect to RFID-enabled license plate 602 onboard vehicle 620.

As shown in FIG. 8, the process begins when a microcontroller onboard a vehicle activates an onboard RFID reader to read an RFID-enabled license plate on the vehicle, wherein the RFID-enabled license plate includes electronic registration information of the vehicle (step 802). Note that the microcontroller can initiate process 800 periodically at a predetermined time interval based on a timer programmed into the microcontroller. The microcontroller then receives from the onboard RFID reader an identifier read from the RFID enabled license plate (step 804). The microcontroller subsequently compares the identifier read from the RFID enabled license plate with an identifier stored on the microcontroller (step 806). The microcontroller next determines if the identifier read from the RFID-enabled license plate matches the stored identifier on the microcontroller (step 808). If so, the microcontroller determines that the license plate is original and the process terminates. Otherwise, if the microcontroller determines that the identifier read from the RFID-enabled license plate does not match the stored identifier, the microcontroller determines that the original license plate on the vehicle is stolen and subsequently send an alert, e.g., by setting off an alarm, or by transmitting a text message to the owner of the vehicle (step 810). Notably, process 800 can be independent from the operation of starting the vehicle.

The accompanying claims and their equivalents are intended to cover such forms or modifications as would fall within the scope and spirit of the embodiments described and claimed herein. For example, the example apparatuses, methods, and systems disclosed herein can be applied to wireless communication devices incorporating HF and/or UHF RFID reader capabilities. The various components illustrated in the figures can be implemented as, for example, but not limited to, software and/or firmware on a processor, ASIC/FPGA/DSP, or dedicated hardware. Also, the features and attributes of the specific example embodiments disclosed above can be combined in different ways to form additional embodiments, all of which fall within the scope of the present disclosure and claims.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of receiver devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable storage medium or non-transitory processor-readable storage medium. The steps of a method or algorithm disclosed herein can be embodied in processor-executable instructions that can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable storage media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable storage medium and/or computer-readable storage medium, which can be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A license plate validation system for a vehicle, comprising:
   a radio frequency identification (RFID) reader located inside the vehicle and configured to read from an RFID-enabled license plate on the vehicle upon detecting an attempt to start the vehicle; and
   a microcontroller coupled to the RFID reader and configured to:
      receive, from the RFID reader, information obtained from the RFID-enabled license plate; and
      determine, based at least on the received information, whether the vehicle is properly registered by:
         determining whether the RFID reader is able to read from the RFID-enabled license plate; and
         in response to determining that the RFID reader is not able to read from the RFID-enabled license plate, determining that the vehicle is not properly registered,
         wherein the RFID reader is not able to read from the RFID-enabled license plate as a result of a registration sticker on the RFID-enabled license plate has degraded due to an expired registration.

2. The license plate validation system of claim 1, wherein the RFID reader is positioned inside the vehicle to be within an effective read range of the RFID-enabled license plate.

3. The license plate validation system of claim 1, wherein the RFID reader is a multi-purpose RFID reader configured to perform one or more functions other than reading the RFID-enabled license plate.

4. The license plate validation system of claim 3, wherein the one or more functions include locking and unlocking the vehicle.

5. The license plate validation system of claim 1, wherein the RFID reader is a dedicated RFID reader configured specifically for validating the RFID-enabled license plate.

6. The license plate validation system of claim 1, wherein the microcontroller is implemented as an onboard computer of the vehicle.

7. The license plate validation system of claim 1, wherein the microcontroller and the RFID reader are integrated as a single electronic module.

8. The license plate validation system of claim 7, wherein the single electronic module is a System on Chip (SoC).

9. The license plate validation system of claim 1, wherein the microcontroller and the RFID reader are coupled through a wired connection, a wireless connection, or a combination of both.

10. The license plate validation system of claim 1, wherein upon determining that the vehicle is not properly registered, the microcontroller is further configured to prevent the vehicle from starting.

11. The license plate validation system of claim 1, wherein the microcontroller stores a first identifier uniquely identifying the vehicle.

12. The license plate validation system of claim 11, wherein the received information includes a second identifier stored in an RFID module embedded in the RFID-enabled license plate.

13. The license plate validation system of claim 12, wherein the microcontroller is further configured to determine whether the vehicle is properly registered by:
 determining whether the second identifier read from the RFID-enabled license plate matches the first identifier stored on the microcontroller; and
 if a match is found, determining that the vehicle is properly registered.

14. The license plate validation system of claim 13, wherein the microcontroller is further configured to permit the vehicle to start if the first and second identifiers match each other.

15. The license plate validation system of claim 13, wherein if the second identifier read from the RFID-enabled license plate does not match the first identifier stored on the microcontroller, the microcontroller is further configured to:
 prevent the vehicle from starting; and
 alert owner of the vehicle that the RFID-enabled license plate is not a valid license plate.

16. A computer-implemented method for automatically validating electronic registration information based on an RFID-enabled license plate of a vehicle, the method comprising:
 upon detecting an attempt to start the vehicle, activating an RFID reader inside the vehicle to access an RFID transponder embedded in the RFID-enabled license plate;
 determining whether the RFID reader is able to read from the RFID transponder; and
 if the RFID reader is not able to read from the RFID transponder, preventing the vehicle from starting;
 otherwise,
  receiving, from the RFID reader, an identifier read from the RFID transponder;
  determining whether the received identifier matches an identifier stored on a microcontroller coupled to the RFID reader; and
  if so, determining that the vehicle is properly registered and permitting the vehicle to start;
  otherwise, preventing the vehicle from starting,
 wherein the RFID reader is not able to read the RFID-enabled license plate when the RFID transponder is decoupled from an RFID booster disposed on the RFID-enabled license plate, and
 the RFID transponder is decoupled from an RFID booster as a result of a registration sticker on the RFID-enabled license plate which would otherwise couple the RFID transponder to the RFID booster has degraded due to an expired registration.

17. The computer-implemented method of claim 16, the method further comprising:
 if it is determined that the received identifier matches the identifier stored on the microcontroller coupled to the RFID reader;
  determining that the RFID-enabled license plate is original;
  otherwise, alerting owner of the vehicle that the RFID-enabled license plate is not original.

18. The computer-implemented method of claim 17, wherein the method is executed periodically at a predetermined time interval.

* * * * *